July 11, 1967

E. A. McELHILL ET AL 3,330,701

PEROXIDES AS CATHODE DEPOLARIZERS

Filed Feb. 13, 1964

*Inventors*
*Elizabeth A. McElhill*
*Bernard A. Gruber*

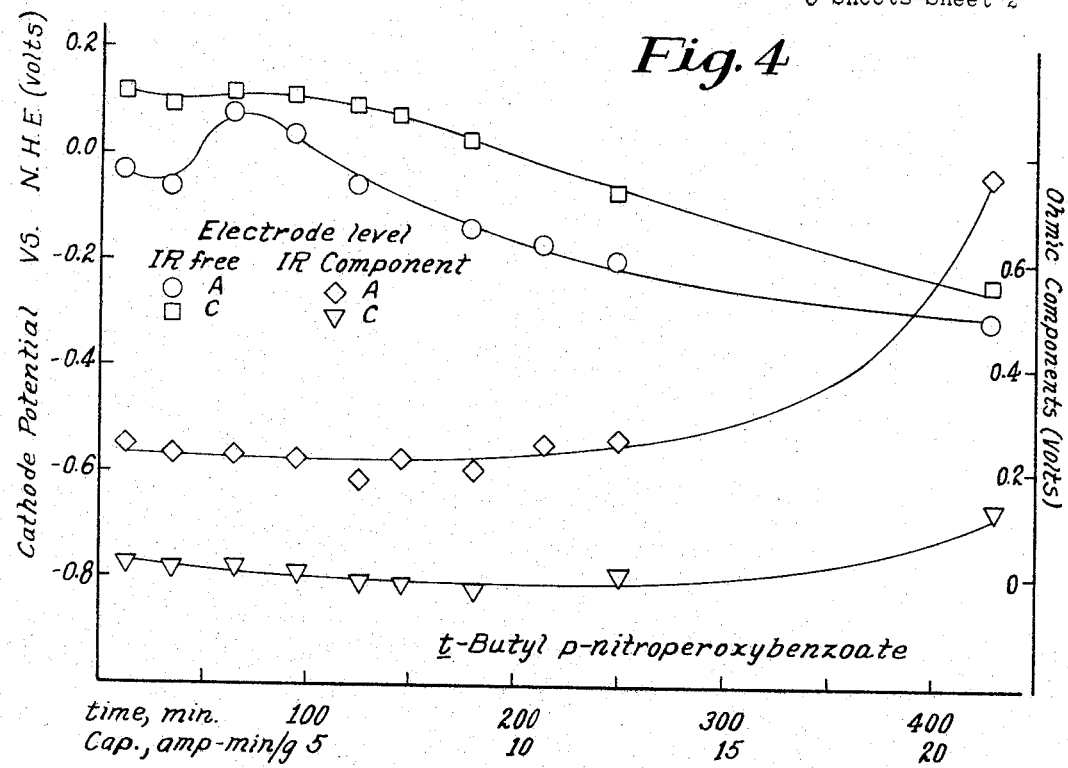
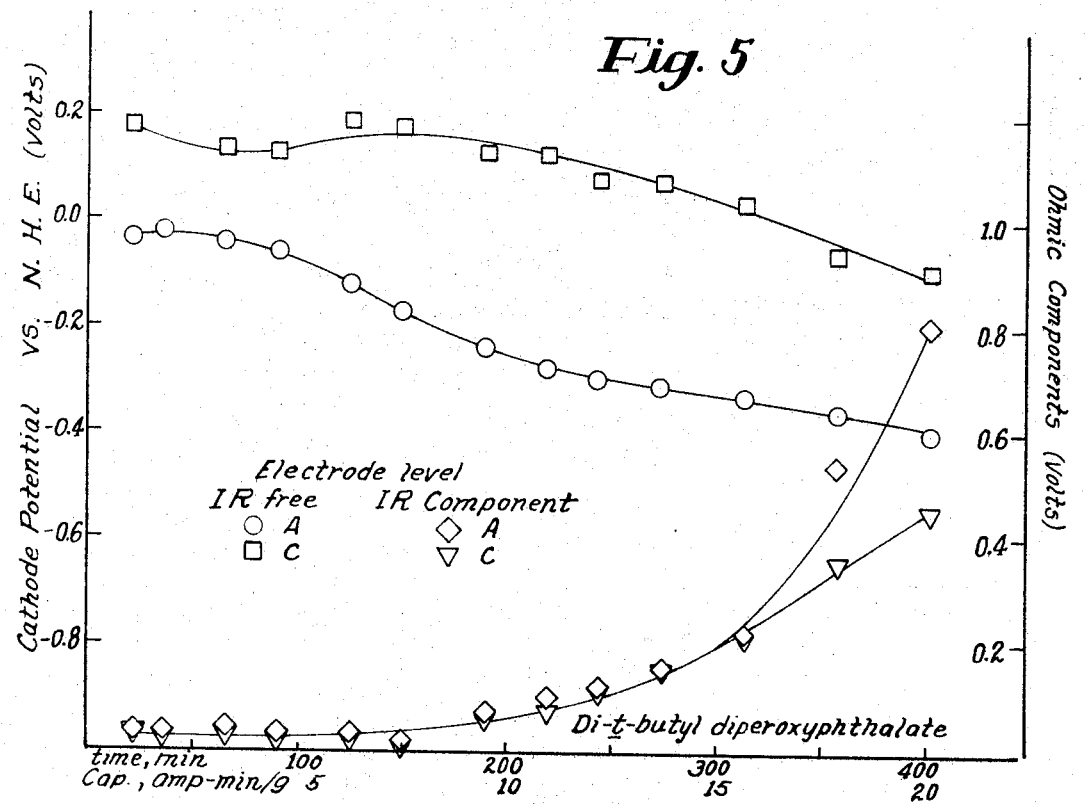

July 11, 1967 E. A. McELHILL ET AL 3,330,701
PEROXIDES AS CATHODE DEPOLARIZERS
Filed Feb. 13, 1964 3 Sheets-Sheet 3
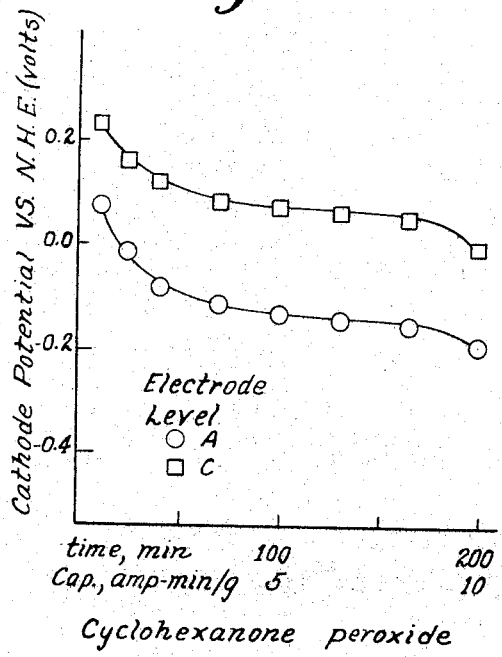
Fig. 6 — Cyclohexanone peroxide
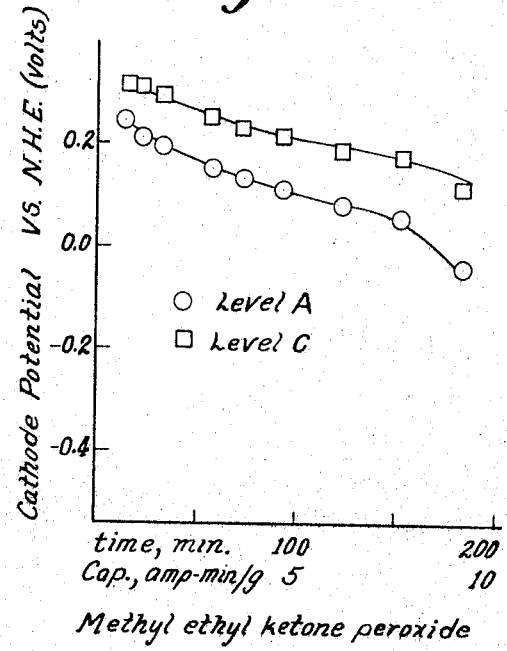
Fig. 7 — Methyl ethyl ketone peroxide
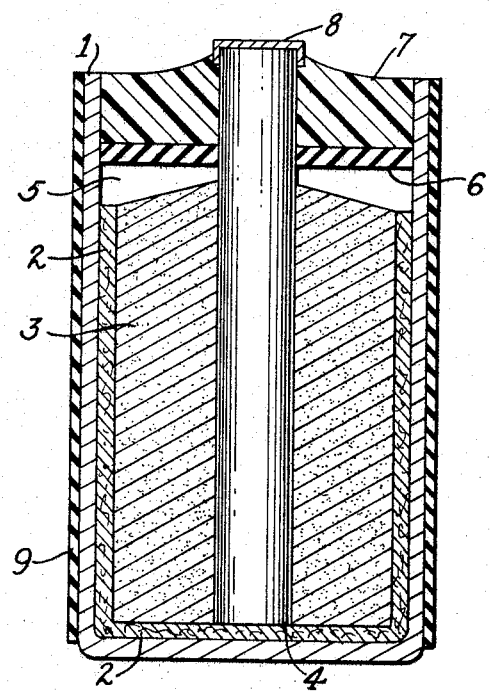
Fig. 8

United States Patent Office 3,330,701
Patented July 11, 1967

3,330,701
PEROXIDES AS CATHODE DEPOLARIZERS
Elizabeth A. McElhill, Cambridge, and Bernard A. Gruber, Boxford, Mass., assignors to Monsanto Research Corporation, St. Louis, Mo., a corporation of Delaware
Filed Feb. 13, 1964, Ser. No. 344,774
16 Claims. (Cl. 136—137)

This invention relates to depolarizers, and more particularly, provides novel primary cell systems comprising organic cathode depolarizers.

In primary voltaic cells of the kind to which this invention relates, the anode includes an anodic metal high in the electromotive series and the cathode section includes a reducible chemical compound. When the cell is connected into a completed electrical circuit, electron flow proceeds with oxidation of the stated anodic metal and reduction of the stated cathodic chemical compound. In the cathode section of the cell, current collection is usually accomplished by an inert conductor, such as a graphite rod, which is contacted by a mixture of an electronically conducting material such as carbon black and the reducible cathode compound. This reducible chemical compound, actively participating in the electrochemical energy conversion effected in the cell, is designated the cathode depolarizer.

A number of factors affect cathode depolarizer performance. Qualities of the electrolyte such as pH may be important. The reducible compound may react chemically with species in the electrolyte in preference to participating in the electrochemical reaction. Hydrolysis by the electrolyte may occur. Ease of electrochemical reduction can be effected by the structural environment of reducible groups, through steric hindrance and through the presence of electronegative or electropositive substituents. A primary cell is usually a non-invariant system, in which reaction products accumulate, changing the composition of the system continuously. Initial depolarizer activity usualy ceases long before complete reduction of the depolarizer supply, which can be explained as the effects of accumulated products, changes in pH, and the like. When the current drain rate increases, still further limiting factors come into play. Rate of solution can control performance, one of the steps in a multistep reduction can be slow and rate-limiting, and so forth.

It is an object of this invention to provide novel electrochemical systems having advantageous properties for primary cells.

A particular object of this invention is to provide novel primary cell electrochemical systems which comprise an organic cathode depolarizer having unusually advantageous performance properties.

These and other objects will become evident upon consideration of the following specification and claims.

In accordance with this invention, primary cell systems are provided comprising an active metal anode and a cathode comprising an organic depolarizer which is an organic peroxide.

Understanding of the invention will be facilitated by a consideration of the drawings, in which:

FIGURES 4 and 5 illustrate closed circuit voltage characteristics of peresters including multiple reducible depolarizing functional groups;

FIGURES 6 and 7 illustrate closed circuit voltage characteristics of ketone peroxides; and FIGURE 8 is a cross-sectional view of a dry cell in accordance with the invention.

Figure 1:
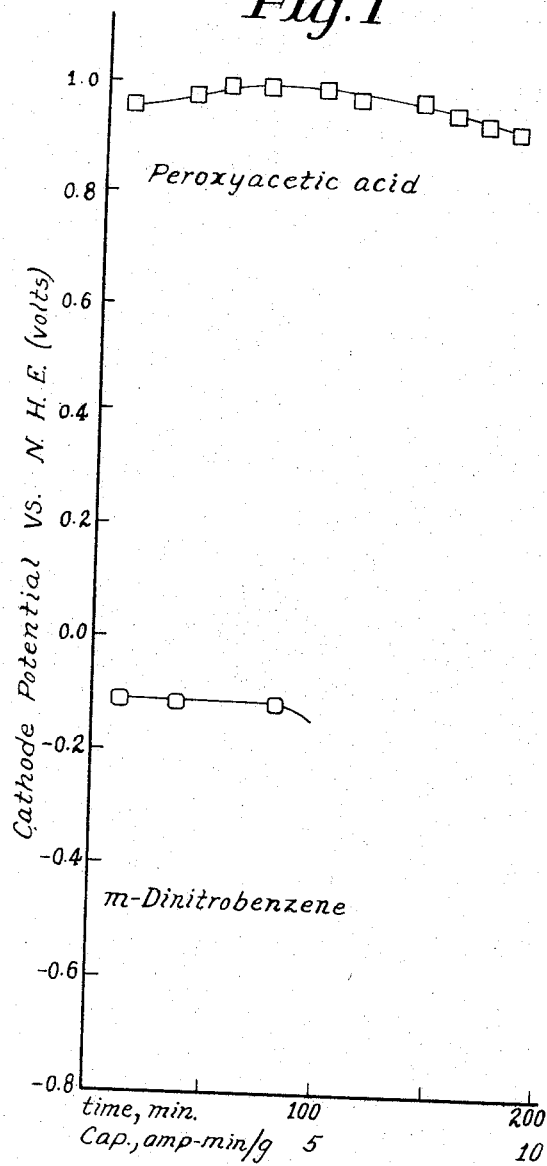
FIGURE 1 illustrates closed circuit voltage characteristics of a peracid as compared to a nitro-aromatic compound under the same conditions.

While the organic peroxides are generally susceptible to electrochemical reduction, it has been found that certain specific types of organic peroxides are particularly advantageous for use in the present connection.

The class of organic peroxides includes several types of peroxides in which an acyl radical adjoins the peroxy, —O—O—, group. The carboxylic acyl peroxides include three major groups:

peracids, of the formula

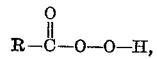

peresters, of the formula

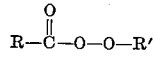

and diacyl peroxides, of the formula

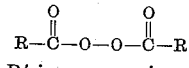

where each R and R' is an organic radical terminating in a carbon atom linked only to atoms selected from C and H atoms (that is, R and R' are not acyl radicals).

It has now been found that peresters, of the formula

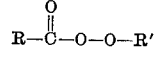

are especially good depolarizers. For depolarizer use, an organic oxidant should preferably produce a substantially steady, sustained potential, and desirably, a high potential. The peresters, it is found, produce potential in the range of about 0.0 to +0.2 volt (referred to the normal hydrogen electrode, NHE), and the potential remains substantially constant over a prolonged period of time.

As is known, the nitroaromatic compounds like m-dinitrobenzene produce prolonged flat potentials as cathode depolarizers. However, these nitro compounds operate at a potential of about −0.2 to −0.4 volt (vs. NHE). Thus the present perester organic depolarizers have the advantage of producing a substantially higher potential, which means that fewer cells are needed in a battery to attain operating voltages for electrical equipment when using these peroxide depolarizers than are necessary when a nitro compound is the depolarizer.

It has further been discovered that a peracid can also be employed to particular advantage as an organic depolarizer in a dry cell.

Organic cathode depolarizers, such as the present organic peroxides, are of interest particularly in cennection with light anode metals such as magnesium. The electrolyte in a conventional dry cell is an aqueous solution of an ammonium halide. It is known that magnesium perchlorate is a more preferable electrolyte for magnesium anodes, having advantages such as producing less corrosion of magnesium anodes during storage of the cell.

The peracids react chemically with an ammonium halide electrolyte, but are stable in aqueous magnesium perchlorate. Thus magnesium perchlorate is the electrolyte of choice for use with peracid cathode depolarizers, providing a system which is stable and further, adapted for use with magnesium anodes. Moreover, it has now been discovered, this type of peroxide will produce unusually high and sustained potentials in electochemical discharge in a perchlorate electrolyte. At low current drains, in fact, a system using a peracid in magnesium perchlorate electrolyte can produce a potential one whole volt higher than m-dinitrobenzene, and maintain its potential. This exceptional and surprising performance of the peracid system combined with its storage qualities provide unusually advantageous organic cell systems.

A second group of organic peroxides, in addition to the acyl peroxides discussed above, comprises the nonacyl peroxides. This group includes hydroperoxides, of the formula R'—O—O—H, and alkyl peroxides, of the formula R'—O—O—R', where each R' is an organic radical terminating in a carbon atom linked only to atoms selected from C and H atoms.

Peroxidation of the carbonyl compounds, aldehydes and ketones, gives alkylidene peroxides, which are peroxides containing one or more non-acyl peroxide groups. Generally these reaction products are complex equilibrium mixtures the product of reaction of a ketone with hydrogen peroxide, for example, contain a mixture of addition and condensation products, usually including polyperoxides such as a 1-hydroperoxy peroxide. The complex reaction products of indefinite structure produced from ketones are generally designated as ketone peroxides, without greater specificity.

It has now been discovered that this type of nonacyl ketone peroxide delivers usefully high potentials under load, on the order of 0.0 to +0.2 volt, and moreover, produces a substantially flat operating potential for sustained periods of time.

The ketone peroxides having the stated useful properties are readily prepared by simple methods and thus are relatively inexpensive materials, which may accordingly be used advantageously for preparation of primary cells as provided by the present invention.

In the primary cell systems provided in accordance with this invention, the anode will be an anodic metal of Groups II and III of the Periodic Table which is high in the electromotive series, such as zinc, cadmium, magnesium and aluminum. Systems comprising magnesium as the anode metal can be prepared with the presently employed cathode depolarizer materials, which are particularly advantageous in minimizing power-to-weight ratios. In referring to anode metals it is intended to include not only the pure metal, but also various alloys thereof. Properties of the stated Group II and III metals such as ease of fabrication, corrosion resistance and the like are frequently improved by alloying the metal with small amounts of other metallic materials: for example, by amalgamating zinc, by alloying magnesium with aluminum and zinc, and so forth. In such alloys, the electrochemically active metal will comprise at least about 50% by weight of the total alloy weight, and more usually, above about 90% by weight of the total. The anode metal may be a combination of more than one of the above-named anode metals.

The cathode will include a depolarizer comprising an organic peroxide. By the organic peroxide is meant a compound including the peroxy radical, —O—O—, in which the peroxy oxygen atoms are joined to substituents selected from hydrogen atoms and organic radicals, and at least one of the peroxy oxygen atoms is joined to the carbon atom of an organic radical.

The organic radical to which the peroxy oxygen atoms are joined, directly or through an intermediate carbonyl radical, in the case of the acyl peroxides, may be a hydrocarbon radical, a heterocyclic radical, or a hydrocarbon or heterocyclic radical with one or more non-interfering substituents. Non-interfering substituents which may be present on the radicals of the presently employed peroxides include electronegative groups such as cyano radicals and halogen radicals like fluorine, chlorine or bromine, as well as electropositive groups such as hydroxy groups and alkoxy groups like methoxy, t-butoxy and the like. Particularly advantageously, the substituents may be reducible groups which can participate in the electrochemical reaction, such as peroxide groups like hydroperoxy radicals, per (carboxylic) acid radicals, per (carboxylate) ester radicals and the like, nitro radicals, and so forth. The heterocyclic radicals present may include heterocyclic nitrogen, oxygen or sulfur atoms.

The organic radical of these peroxides may be saturated or may include aliphatic (olefinic or acetylenic) or aromatic unsaturation; in general, the organic radicals joined directly to peroxy oxygen atoms in stable peroxides are aliphatic, whereas in acyl peroxides, the organic radical joined to the carbonyl radical attached to a peroxy oxygen atom may include carbon-to-carbon unsaturation without undue instability. In general, the presently contemplated organic radicals contain from 1 to 24 carbon atoms; usually it is advantageous to minimize the size of the organic radical carrying the actively depolorizing substituents, and organic radicals of 12 carbon atoms or below are preferred.

Most preferably, the organic peroxide employed will be selected from the above-discussed class of peroxide depolarizers with advantageously high and flat operating potentials, consisting of peracids, peresters, and ketone peroxides. The electrochemical behavior characteristic of many organic oxidants, such that under even moderate current drains, the potential falls off rapidly, may be encountered in certain other peroxide types, such as the diacyl peroxides: their coulombic capacity is thus less favorable than that of members of the stated class. The simple non-acyl peroxides such as hydroperoxides and alkyl peroxides generally give relatively low closed circuit potentials, on the order of −0.2 to −0.5 volt (vs. NHE), and the potentials produced also decline fairly rapidly under load. Surprisingly, however, the stated acyl peroxides including peracids and peresters, and non-acyl peroxides of the complex ketone peroxide type not only deliver a high potential, but sustain it.

The peroxy esters (peresters), which form an especially preferred embodiment of the peroxide depolarizers of this invention, are illustrated, for example, by dimethyl diperoxyterephthalate,
diethyl diperoxyterephthalate,
diisopropyl diperoxyterephthalate,
t-butyl peroxyacetate,
t-butyl trifluoroperoxyacetate,
t-butyl peroxyacrylate,
t-butyl hydrogen monoperoxy succinate,
di-t-butyl diperoxysuccinate,
di-t-butyl diperoxyadipate,
t-butyl peroxynonanoate,
t-butyl peroxycaprate,
t-butyl peroxyundecanoate,
t-butyl peroxylaurate,
t-butyl peroxymyristate,
t-butyl peroxystearate,
t-butyl peroxybenzoate,
t-butyl p-chloroperoxybenzoate,
t-butyl p-nitroperoxybenzoate,
t-butyl 3,5-dinitroperoxybenzoate,
t-butyl p-methoxyperoxybenzoate,
t-butyl monoperoxyterephthalate,
t-butyl monoperoxyphthalate,
di-t-butyl diperoxyphthalate,
di-t-butyl diperoxyterephthalate,
t-butyl 2,6-dinitroperoxybenzoate,
t-butyl methyldiphenylperoxyacetate,
t-butyl 3-phenylperoxyacrylate,
t-amyl peroxyacetate,
t-amyl acetylperoxyacetate,
t-amyl p-nitroperoxybenzoate,
t-amyl hydrogen monoperoxyphthalate,
1,1,2-trimethylpropyl p-nitroperoxybenzoate,
2-cyclohexenyl peroxyacetate,
1-methylcyclohexy p-nitroperoxybenzoate,
1,1-diethylpropyl p-nitroperoxybenzoate,
1-ethyl-1-methylbutyl monoperoxyphthalate,
1-ethylcyclohexyl p-nitroperoxybenzoate,
1-ethyl-1-methylamyl monoperoxyphthalate,
dimethylphenylmethyl peroxyacetate,
dimethylphenylmethyl peroxybenzoate,
dimethylphenylmethyl hydrogen monoperoxyterephthalate,
9-octahydronaphthyl peroxybenzoate, 9-octahydronaphthyl p-bromoperoxybenzoate,
9-octahydronaphthyl p-nitroperoxybenzoate,
9-octahydronaphthyl peroxy-p-toluate,
9-octahydronaphthyl p-methoxyperoxybenzoate
and so forth.

Exemplary of the organic peroxy acids (peracids) which may be employed to particular advantage as depolarizers in accordance with this invention are peroxyacetic acid, peroxy-2-chloropropionic acid, peroxypropionic acid, peroxybutyric acid, 1-butylperoxyacetic acid, peroxyhexanoic acid, peroxycaprylic acid, peroxynonanoic acid, peroxycapric acid, peroxylauric acid, peroxymyristic acid, peroxypalmitic acid, peroxyfuroic acid, peroxybenzoic acid, p-chloroperoxybenzoic acid, p-nitroperoxybenzoic acid, peroxy-p-toluic acid, p-methoxyperoxybenzoic acid, monoperoxyphthalic acid, 3-phenylperoxyacrylic acid and the like.

The third group of particularly preferred peroxides in accordance with this invention are carbonyl peroxides, and more especially, ketone peroxides. As explained above, these are materials of indefinite structure, which usually are mixtures including but not composed exclusively of polyperoxides, prepared by peroxidizing the corresponding ketone with a peroxide such as aqueous hydogen peroxide or perchloric acid, under neutral or acid conditions. For the present purposes, desirably at least 10 mole-percent, and preferably at least 25 mole-percent of the mixture will be a polyperoxide. The cyclohexanone peroxide of commerce, for example, is chiefly a mixture of bis(1-hydroxycyclohexyl) peroxide and, predominantly, 1-hydroperoxycyclohexyl 1-hydroxycyclohexyl peroxide. The peroxide obtained from ethyl methyl ketone is 25% of the cyclic peroxide of formula

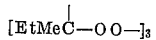

and 45% of the peroxide of formula

where $n=2$, with the remainder peroxides of the latter structure in which $n=1$, 3 or a higher integer. The products of this dialkyl ketone are typical of ketone peroxides, and similar products may be obtained from ketones such as methyl n-butyl ketone, methyl t-butyl ketone, methyl tetrahydronaphthyl ketone, diethyl ketone, ethyl butyl ketone, t-butyl trichloroethyl ketone, ethyl propyl ketone, dibutyl ketone, t-butyl cyclohexyl ketone, cyclopentanone, methylcyclohexanone, and the like. In general, the presently preferred ketone peroxides may be described as aliphatic hydrocarbon ketone peroxides, and more particularly, as aliphatic hydrocarbon ketone peroxides comprising polyperoxides.

While the foregoing represent especially preferred classes of peroxide depolarizers for use in accordance with this invention, it to be appreciated that various other classes of peroxides may also be employed similarly in primary cells as cathode depolarizers. Indicative of the variety of other peroxides included in the general class of organic peroxides as contemplated herein are, for example, alkyl hydroperoxides including propyl hydroperoxide, p-tolylmethyl hydroperoxide, p-isopropylbenzyl hydroperoxide and the like; secondary hydroperoxides such as diphenylmethyl hydroperoxide, cyclohex-2-enyl hydroperoxide, 1-hydrindenyl hydroperoxide, 1-tetrahydronaphthyl hydroperoxide and the like; and tertiary hydroperoxides, which have particularly preferred superior stability, such as t-butyl hydroperoxide, 1,1-dimethylpropyl hydroperoxide, triethylmethyl hydroperoxide, 1,1-dimethylisobutyl hydroperoxide, 1,1,6-trimethyl hptyl hydroperoxide, 1,6-dimethyloctane dihydroperoxide, 1-phenylisopropyl hydroperoxide, (p-nitrophenyl)diphenylmethyl hydroperoxide, triphenylmethyl hydroperoxide, 1,2-dimethyl-2-cyclohexenyl hydroperoxide and so forth. Dialkyl peroxides which may be employed as depolarizers in electrochemical cells may be exemplified by dialkyl peroxides such as isopropyl methyl peroxide, di-t-butyl peroxide, bis(1,1-dimethylpropyl) peroxide, bis(triethylmethyl) peroxide, allyl t-butyl peroxide, bis(1-methyl-3-butynyl) peroxide, t-butyl 1-methylcyclohexyl peroxide, methyl tetrahydronaphthyl peroxide, t-butyl 1-phenylethyl peroxide, t-butyl dimethylphenylmethyl peroxide, t-butyl triphenylmethyl peroxide, t-butyl α-naphthyldiphenylmethyl peroxide, and t-butyl (p-nitrophenyl)diphenylmethyl peroxide. This class of peroxides also includes the 1,4-bridged cyclic peroxides, including for example 1,1,3-trimethyl-1,4-exocycloperoxene-2, ascaridole (1,4-epidioxy-2-p-menthene), ergosterol peroxide, anthracene peroxide (9,10-dihydro-9,10-epidioxyanthracene) and the like.

The diacyl peroxides are mostly solids and are usually stable under ordinary conditions, although the lower members of this series are somewhat sensitive. Examplary of this type of peroxide are, for example, dilauroyl peroxide, crotonyl peroxide, di-2-furoyl peroxide, bis(β-2-furyl acryloyl)peroxide, dinicotinyl peroxide, dibenzoyl peroxide, di-p-toluoyl peroxide, bis(p-chlorobenzoyl) peroxide, bis(p-methoxybenzoyl) peroxide, bis(p-cyanobenzoyl) peroxide, bis(p-nitrobenzoyl) peroxide, α,α'-dinaphthoyl peroxide and the like.

The depolarizer material included in the present primary cell systems may consist essentially of one or more of the above-described organic peroxide depolarizers. Alternatively, the organic peroxide depolarizer may if desired be combined with other active depolarizers, including organic depolarizers such as meta-dinitrobenzene and inorganic depolarizers such as copper oxide and manganese dioxide. It can be shown that in cells including a mixture of depolarizers, the depolarizer discharging at the higher potential will reduce first. Thus where an organic peroxide of high discharge potential is employed as a depolarizer in a mixed depolarizer combination, advantage can be taken of its higher potential, which will prevail while a sufficient supply of this depolarizer lasts. Thus beneficial effects of cathode depolarizers as employed in accordance with this invention can be obtained when they constitute a minor proportion of the total depolarizer content, but sufficient to produce discharge at their characteristic operating voltages constituting a significant proportion, such as at least about 10% of the power output of the cell. Such compositions are intended to be included herein in the class of depolarizer compositions consisting essentially of cathode depolarizers, as contemplated by the present invention.

A further requirement of a primary cell system in accordance with this invention is a means of providing ionic, while excluding electronic, contact between anode metal and cathode depolarizer. This may be a fluid electrolyte, which preferably permeates a bibulous separator between the anode and cathode materials.

The ionized solute in the electrolyte may be generated as the cell is operated. Thus the fluid electrolyte as introduced may consist essentially of a fluid capable of acting as an ion transport medium, such as tap or distilled water, where the action of the cell is such as to produce salt-forming ions in operation, since the ions so formed can act as the electrolytically conductive solute. Usually, it will be advantageous to introduce a soluble ionizable salt into the electrolyte fluid initially to provide for immediate ionic conductance in operation of the cell. The cation of the ionizable salt may be an alkali metal such as lithium, sodium, or potassium, an alkaline earth metal such as magnesium, zinc, strontium, cadmium or barium, or a non-metallic ion such as the ammonium ion. The anion of the salt may be a halide such as chloride, bromide and the like, an oxyhalide such as perchlorate, and so forth. Usual electrolyte solutes such as ammonium bromide can be employed to good effect in the primary cell system of this invention. For use with the organic per acid depolarizers of this invention, a metal salt and desirably a magnesium salt, such as the perchlorate, will be preferred.

The solvent employed to produce the fluid electrolyte may be water, or alternatively, it is contemplated that this may be an ionizing organic solvent. The ionizing organic solvents are those with dielectric constants at least 1/6th of that of water, such as dimethylformamide, dimethylsulfoxide and the like.

Bibulous separators which may be permeated by the stated fluid electrolytes may comprise porous cellulosic materials like absorbent paper such as kraft paper, woven materials such as cotton fabric, gel-like materials such as carboxymethylcellulose, a starch gel and so forth, alone or in combination. Useful starch gels are prepared by combining starch or a mixture of starch and a cereal flour such as wheat flour with the fluid electrolyte, following which gelatinization may be produced by action of the electrolyte, by heating, and so forth. Other porous organic materials such as films of a plastic like porous polyethylene or inorganic porous products such as ceramics or glass can be used. Ion exchange membranes may also be used as separators, in which case the separator itself may perform the functions both of separator and of electrolyte. Ion exchange membrane separators are particularly contemplated as useful where the primary cell systems of this invention are embodied in a fuel cell construction, especially the tape separator fed fuel cell system as provided in copending application S.N. 232,144, filed Oct. 22, 1962, by Bernard A. Gruber, now Patent No. 3,260,620, the description of which is incorporated herein by reference.

The present invention may be practiced in primary cell embodiments of either the dry or reserve cell type. In reserve cells, one component, usually the electrolyte, is kept separate from the remainder of the system until just prior to use of the cell. Where a dry cell construction is used, in which the primary cell system components are maintained in contact over a period of time prior to imposition of current drain, the electrolyte may advantageously contain corrosion inhibitors to protect the anode metal. Exemplary of these inhibitors are the inorganic salts such as barium chromate, mixtures of barium chromate with lithium chromate and the like, organic inhibitors such as 8-chloroquinoline, and so forth.

The anode metal may be in the form of a powder, film, or sheet of sufficient thickness to possess structural rigidity. Physical configurations of anode metal sheets may be those of conventional primary cell structures, such as sheets where flat cell constructions are used, and cups serving as containers for the cathodic portion of the cell in cylindrical cell constructions. Leads may be provided for connecting the anode metal to complete the electrical circuit in employing the cell system, or direct contact can be made with an exterior face of the anode structure for this purpose.

The cathode depolarizer is usually a poor electrical conductor, and is associated in the cathode structure with additional cathode components, including a cathode current collector. The stated current collector will provide a means of making an electrical connection to the cathode depolarizer to complete an external circuit, and is usually a coherent structure possessing electrical conductivity made of a substance which is desirably in inert conductive material such as conductive carbon. A conductive graphite rod or bar is suitable. In the bulk of the cathode depolarizer mass contacting the stated current collector, the cathode depolarizer is associated with an electronically conductive inert particulate material distributed throughout the mass. This conductive material will normally be a conductive carbon of the kind known as a battery black. Generally this is a black produced by pyrolysis of an unsaturated carbon compound, such as an acetylene black. The ratio of conductive carbon to cathode depolarizer may vary, for example, between 90:10 and 10:90 (by weight), but is generally about 50:50. The cathode depolarizer, which as stated will usually be associated with conductive carbon particles in a mixture designated the cathode mix, may also have admixed therewith electrolyte solution permeating the cathode mix, additional cathode depolarizer materials, binders such as polyvinyl alcohol, and so forth.

The invention is illustrated but not limited by the following examples.

*Example 1*

Figure 2:
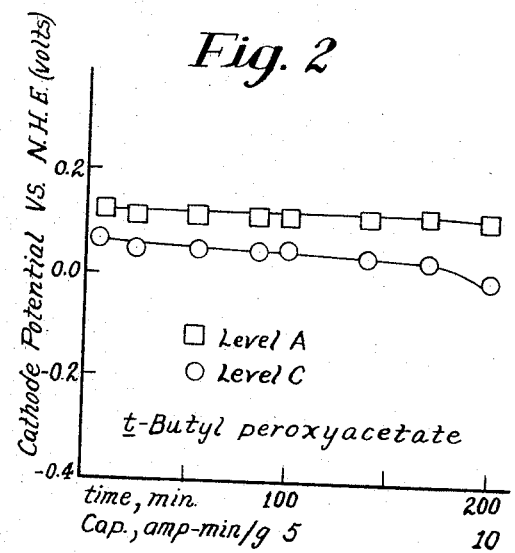
FIGURES 2 and 3 illustrate closed circuit voltage characteristics of peresters.
Figure 3:
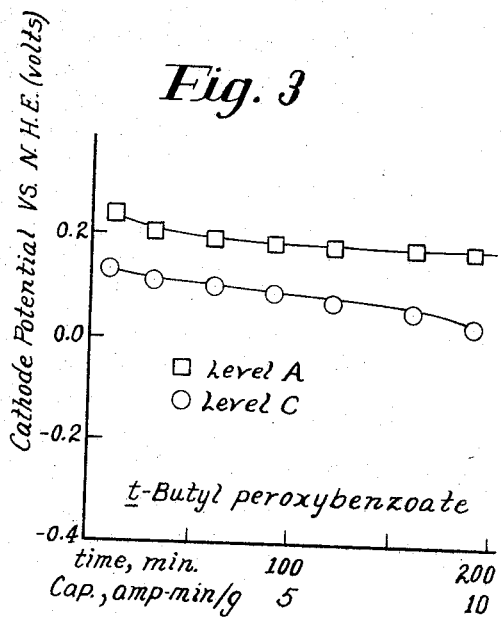

This example illustrates depolarizer characteristics of peresters as illustrated in FIGURES 2 and 3.

The cell used to measure the potentials of the organic depolarizers, referred to the normal hydrogen electrode, consists of a methacrylate polymeric body with calomel reference electrode openings provided at different levels so that potentials can be determined as a function of distance from the anode. The A level is at the bottom of the cake (high current density) while the C level values are measured just above the cake (lower current density).

Experimental apparatus for the half cell measurements is thermostated at 30° C. A mixture of the depolarizer with carbon black is placed in the cell on a cation exchange membrane, below which is positioned a counter electrode consisting of a carbon rod about ½ inch in diameter.

The volume of electrolyte introduced is just enough to wet the cathode slug from top to bottom. A graphite pressure disc is placed over the cathode mix to provide electrical contact between the mix and the graphite rod to which external connections are made. A 550 gram weight is attached to the graphite rod to insure reproducible contact of the graphite with the cathode cake.

Electrical connections are made to the counter electrode, the graphite rod contacting the pressure disc, and the saturated calomel electrodes. The cathode is driven by lead-acid storage batteries connected in series, which are in series with a milliammeter and a variable resistance. A voltmeter is included in the circuit between the calomel electrode and the working electrode.

At 0.025 ampere (0.05 ampere per gram depolarizer) in this cell, with approximately 0.2 square inch area, the projected average area current density is 0.127 ampere per square inch.

The charge used in measuring the potentials plotted in the figures is a mixture of 0.5 g. of depolarizer and 0.25 g. of conductive carbon (Shawinigan acetylene black), and the electrolyte is an aqueous solution of 168 g. per liter ammonium bromide, except for Example 3.

The potentials measured with this cell for t-butyl peroxyacetate are shown in FIGURE 2. The theoretical coulombic capacity of this perester is 24 amp-min./g.; found, 14 amp-min./g. (average), which is a coulombic efficiency of about 60%. The operating potential at both high (level A) and low (level C) current density remains flat for up to 200 minutes.

For t-butyl peroxybenzoate, the theoretical coulombic capacity is 16.6 amp-min./g., found (low current density level), 16.5 amp-min./g., which is substantially 100% efficiency. The operating potential remains substantially flat at 0.1–0.2 volt for 200–300 minutes. The data for potential measurements with this depolarizer in the above-described cell are illustrated in FIGURE 3.

*Example 2*

This example further illustrates cathode depolarizer characteristics of peresters.

The equipment described in Example 1 is used to measure potentials delivered, referred to the normal hydrogen electrode, but with the addition of a Kordesch-Marko bridge [J. Electrochem. Soc., (1960) 107, 480], to permit separation of the ohmic (internal resistance) component from the potential measured.

FIGURE 4 illustrates the cathode depolarizer performance of t-butyl p-nitroperoxybenzoate, measured using an 0.5 gram charge of the peroxide mixed with 0.25 g. of carbon black and wetted with a solution of 168 g. NH₄Br per liter of water. In this difunctional compound, both the peroxide group and the nitro group can contribute to the depolarizer activity. The theoretical capacity of this peroxide compound is 54 amp-min./g.; found, approximately 21 amp-min./g., or about 40% efficiency. As will be evident from the figure, there is a substantial voltage drop due to internal resistance with this nitro compound; and this is typical of nitro depolarizers. However, the potential delivered by this depolarizer is high and does not drop substantially over a prolonged period of time.

FIGURE 5 illustrates the depolarizer characteristics of di-t-butyl diperoxyphthalate, with the ohmic component separated. The di-perester used is a 50% solution of di-t-butyl diperoxyphthalate in di-t-butyl phthalate; a one gram sample of the solution is used, mixed with 0.25 g. of carbon black, with a 168 g./liter aqueous NH₄Br electrolyte, at a current density of 0.05 amps per gram of the peroxy compound. For the di-perester, the theoretical efficiency is 21 amp-min./g., found, 20 amp-min./g., which is over 95% efficiency.

As can be seen from FIGURE 4, with this polyfunctional depolarizer in which peroxide radicals are the exclusive depolarizing groups, little or no internal resistance appears at either high or low current densities until after extended times of operation.

Example 3

This example illustrates depolarizer characteristics of a peracid, as illustrated in FIGURE 1.

Using the test equipment described in Example 1, potentials are measured using 2 M $Mg(ClO_4)_2$ as electrolyte. The materials for which measurements are made include peroxyacetic acid and, for comparison, a nitro depolarizer, m-dinitrobenzene. The peroxyacetic acid used is a 40% (aqueous) solution, and therefore 1.25 g. of this dilute material is charged to the cell, mixed with 0.25 g. of carbon black. The m-dinitrobenzene potential is measured in the cell with a charge of 0.5 g. mixed with 0.25 g. of carbon black.

The potentials of the respective peracid and nitro depolarizers at 0.05 amp/g. depolarizer are plotted in FIGURE 1 for the low current density level of the cell (level C). As will be seen from the figure, the peracid potential is more than one volt higher than that of the nitro compound.

Example 4

This example illustrates depolarizer characteristics of ketone peroxides.

Potentials of the peroxides obtained from cyclohexanone and from methyl ethyl ketone are measured by the procedures described in Example 1, and plotted respectively in FIGURES 6 and 7. The charge in the cell in each case is 0.5 g. of the peroxide material, mixed with 0.25 g. of carbon black. The cyclohexanone peroxide employed is a solid mixture of peroxides, the main component of which is

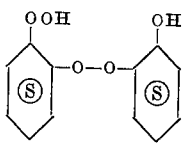

The purity of the sample, based on the above structure, is 86% (active oxygen analysis). The methyl ethyl ketone peroxide, which is considered to be a mixture of polymeric and cyclic peroxides, has an active oxygen analysis value of 10.8%. The potential of both ketone peroxides are measured using an aqueous solution of 168 g. per liter ammonium bromide as electrolyte. As the data plotted in the figures show, these peroxides produce an elevated potential even at high current densities, which remains high even after a prolonged time of operation of the cell.

Example 5

This example illustrates an exemplary embodiment of the cell system of the present invention in which the cathode depolarizer is coupled with an anode metal through an electrolyte, as illustrated in FIGURE 8.

FIGURE 8 is a diagrammatic illustration of a vertical section of a dry cell prepared in accordance with the invention, in which 1 is a cup of magnesium, 2 is a separator made of porous material such as kraft paper lining the interior of the cup, and 3 is a cathode mix prepared by combining acetylene carbon black particles and an organic peroxide in a depolarizing amount. For example, this may be a 50:50 by weight mixture of t-butyl perbenzoate and acetylene black. The paper separator and the cathode mix are permeated by a liquid electrolyte, which may be, for example, an aqueous solution saturated with barium chromate, and further containing a concentration of one gram per liter of lithium chromate, and having dissolved therein magnesium bromide, as an electrolyte, in a concentration of 168 grams per liter. Centrally located in the cell, and prevented from contacting the exterior can 1 by the separator 2 is a carbon rod 4 which is the cathode current collector. An air space 5 above the top of the cathode mix intervenes between it and an insulating washer 6 and a seal 7 over the top of the cell. A cap 8 provides electrical connection to the cathode current collector 4, and a jacket 9 covering the exterior of the can 1 insulates it from contact on the can sides while leaving the bottom free for making electrical contact.

Connection of the cell system is made, by a cathode lead attached to the cap 8 and an anode lead contacting the bottom of the can 1, into a completed electrical circuit (not shown) in which the current generated is passed through a resistance. The magnesium/peroxide above-described system generates a potential of 1.6 volts, which is sustained as current drain is continued.

While the invention has been described with reference to various specific preferred embodiments thereof, it is to be appreciated that modifications and variations can be made without departing from the scope of the invention, which is limited only as defined in the appended claims.

What is claimed is:

1. A primary cell having an anode formed by a metal standing high in the electromotive series, in combination with a cathode including a depolarizer consisting of an organic peroxide.
2. The cell of claim 1 wherein said depolarizer is a perester.
3. The cell of claim 1 wherein said organic peroxide is t-butyl peroxyacetate.
4. The cell of claim 1 wherein said organic peroxide is t-butyl peroxybenzoate.
5. The cell of claim 1 wherein said organic peroxide is a peroxide including multiple reducible depolarizing functional groups.
6. The cell of claim 1 wherein said organic peroxide is a perester including multiple reducible depolarizing functional groups.
7. The cell of claim 1 wherein said organic peroxide is a di-perester.
8. The cell of claim 1 wherein said organic peroxide is a di-t-butyl diperoxyphthalate.
9. The cell of claim 1 wherein said organic peroxide is a nitro-substituted perester.
10. The cell of claim 1 wherein said organic peroxide is t-butyl p-nitroperoxybenzoate.
11. The cell of claim 1 wherein said organic peroxide is a peracid.
12. The cell of claim 1 wherein said organic peroxide is peroxyacetic acid.
13. The cell of claim 1 wherein said organic peroxide is a ketone peroxide.
14. The cell of claim 1 wherein said organic peroxide is a ketone peroxide containing more than one peroxide group per molecule.

15. The cell of claim 1 wherein said organic peroxide is cyclohexanone peroxide.

16. The cell of claim 1 wherein said organic peroxide is methyl ethyl ketone peroxide.

References Cited

UNITED STATES PATENTS

| | | | |
|---|---|---|---|
| 2,706,213 | 4/1955 | Lucas | 136—137 X |
| 2,880,122 | 3/1959 | Morehouse et al. | 136—137 |
| 2,912,478 | 11/1959 | Justi et al. | 136—86 |
| 3,073,884 | 1/1963 | Pinkerton | 136—137 X |
| 3,098,770 | 7/1963 | Horowitz et al. | 136—100 |
| 3,121,028 | 2/1964 | Story | 136—137 X |
| 3,163,560 | 12/1964 | Grimes et al. | 136—86 |

FOREIGN PATENTS 162,076  10/1952  Australia.

WINSTON A. DOUGLAS, *Primary Examiner.*

D. L. WALTON, *Assistant Examiner.*